United States Patent Office 3,369,755
Patented Feb. 20, 1968

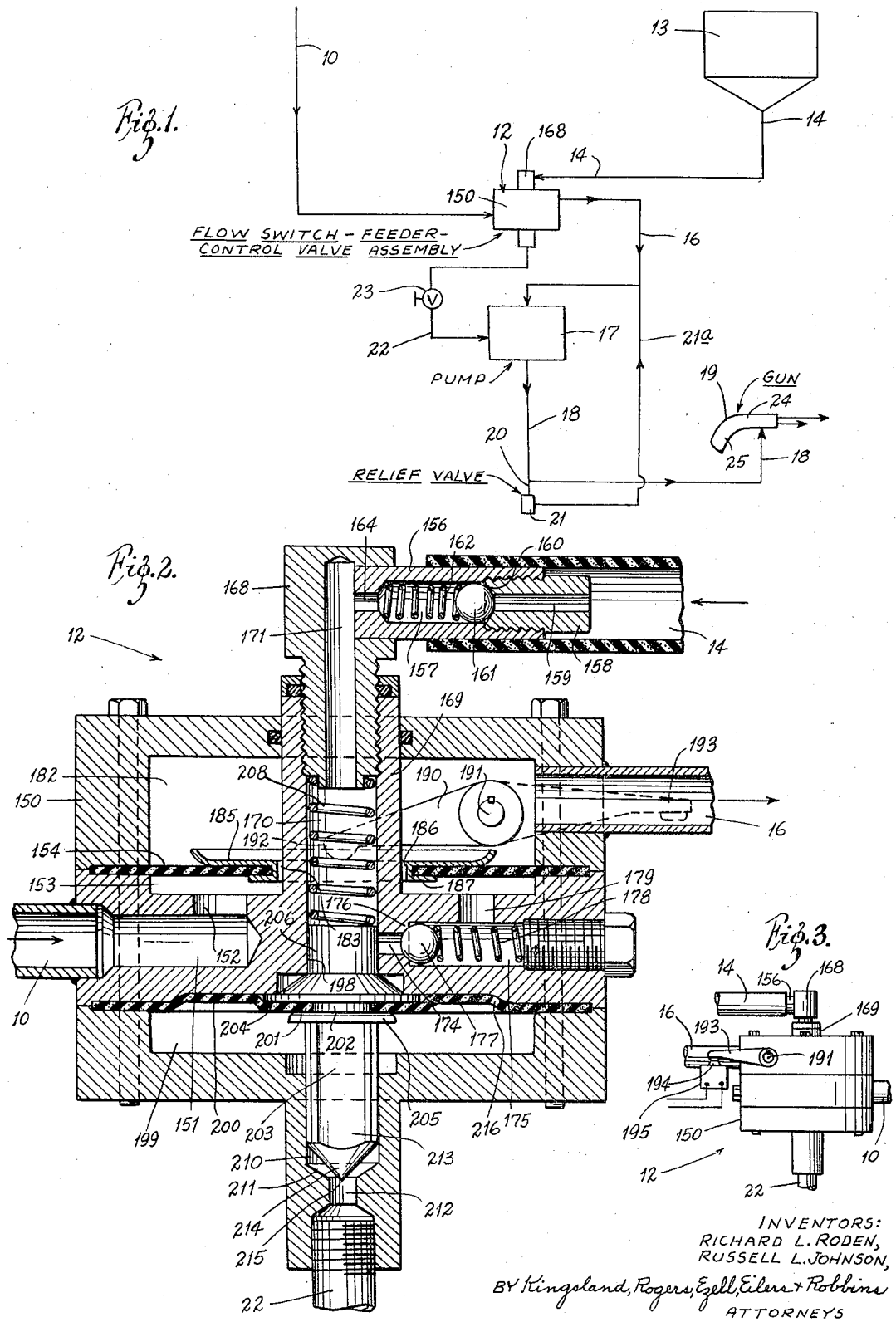

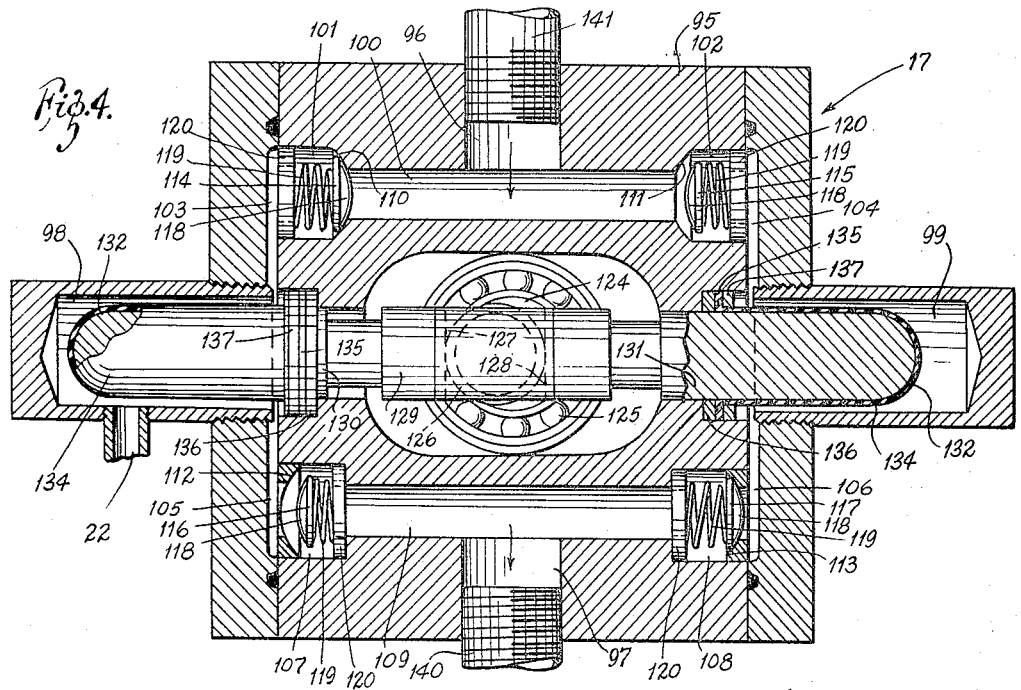
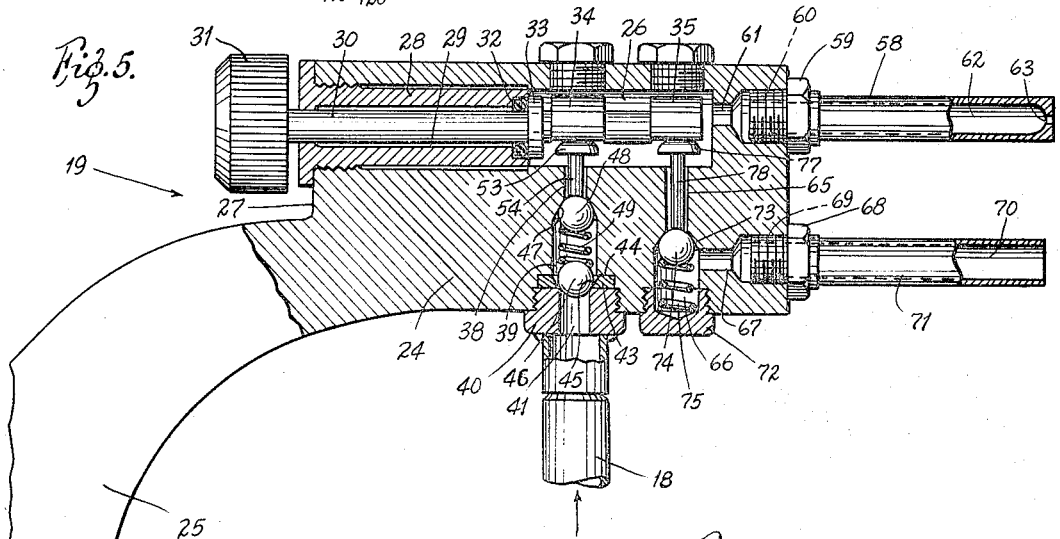
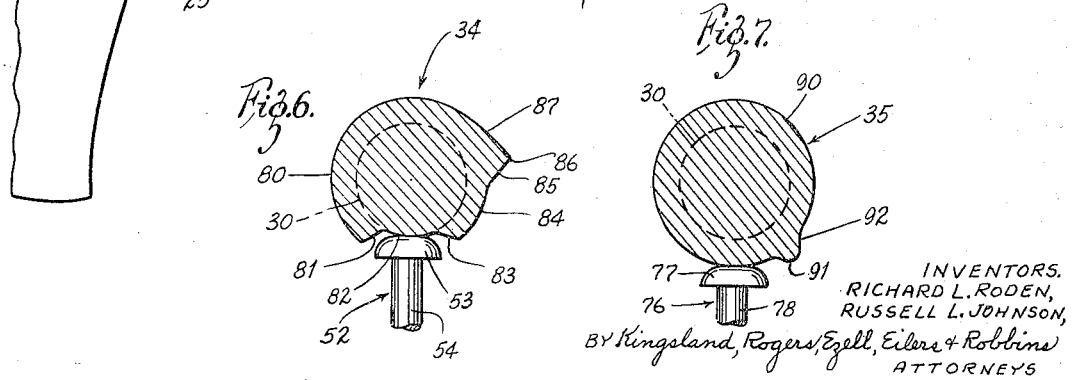

3,369,755
PRESSURE MIXER AND DISPENSER SYSTEM
Richard L. Roden and Russell L. Johnson, Dallas, Tex., assignors to John E. Mitchell Company, Dallas, Tex., a corporation of Missouri
Filed Dec. 31, 1964, Ser. No. 422,612
7 Claims. (Cl. 239—126)

This invention relates to a pressure mixer and dispenser system for selectively mixing and dispensing fluids in a high pressure stream. In particular, the invention relates to a high pressure mixer and dispenser system having a dispenser gun remotely located from the mixer portion of the system, wherein selection of fluids to be dispensed is controlled at the gun.

In general, the invention comprises a dispensing gun having valve mechanisms for regulating the back pressure of fluid flowing through the gun and for blocking completely the flow of fluid through the gun. Fluid is supplied to the gun by a reciprocating pump which is fed by a flow switch-feeder-control valve assembly. The pump operates to supply fluid to the gun in pulsating motions. The flow switch-feeder-control valve assembly operates in response to pressures felt by the pump as a result of changes in back pressures from the gun to control the feeding of different fluids through the pump. Appropriate pressure responsive valve mechanisms in the flow switch-feeder-control valve assembly control whether or not there is to be a single fluid or a mixture of fluids or whether the entire system is to stop.

The principal objects of the invention are to provide a system having the foregoing capabilities and advantages, and in partciular to provide a pressure mixer and dispenser system that permits selective mixing of two different liquids supplied under high pressure to a dispensing gun.

There are various uses for the system, but a principal one is for a carwash system wherein water at normal city pressure and a detergent concentrate are supplied to the flow switch-feeder-control valve assembly. Control over which liquid or combination of liquids is to be dispensed is maintained at the dispenser gun which is mounted to the end of a flexible hose and can be directed as desired against the side of a car. Sometimes plain flushing is desired, whereas at other times, a mixture of water and detergent concentrate for cleaning is desired, followed by clear rinsing. The selection of these different mixtures of water and concentrate is made at the gun.

An object of the invention is to provide a mixer and dispenser for liquids wherein selection of different mixes is made at the dispensing gun.

Other objects and advantages will appear.

In the drawings:

FIGURE 1 is a schematic flow diagram of the pressure mixer and dispenser system;

FIGURE 2 is a view in medial section through the flow switch-feeder-control valve assembly;

FIGURE 3 is a side elevation view on a reduced scale of the flow switch-feeder-control valve assembly as viewed from the back side of FIGURE 2;

FIGURE 4 is a view in medial section through a suitable reciprocating pump which may be used in the system;

FIGURE 5 is a view in medial section through the gun;

FIGURE 6 is a view in transverse section through the inlet valve cam; and

FIGURE 7 is a view in transverse section through the auxiliary outlet valve cam.

The system, as shown schematically in FIGURE 1, includes a pipe 10 which is adapted to be connected to an available outlet from a city water supply or to any other source of water. The pipe 10 is connected to a flow switch-feeder-control valve assembly 12 as will be described.

A suitable tank or vat 13 contains liquid detergent or any other concentrate that is to be dispensed by the system. The tank 13 is connected by a pipe 14 to supply concentrate to the flow switch-feeder-control valve assembly where water and concentrate are selectively mixed.

A pipe 16 is connected to deliver liquid from the flow switch-feeder-control valve assembly to a reciprocating pump 17. The output from the pump 17 is connected by a flexible pipe or hose 18 to a dispenser gun 19. There is a branch pipe 20 off the hose 18 leading to a relief valve 21. A pipe or conduit 21a leads from the discharge of the relief valve 21 back to the inlet of the pump 17. A throttling valve 23 is inserted in the pipe 22 for the purpose of controlling the amplitude of the pulsations delivered to the flow switch-feeder-control valve assembly 12, thereby controlling the rate of flow of liquid pumped by the feeder from the tank 13. Alternatively, the throttling valve 23 may be located in the pipe 14. A pipe or conduit 22 leads from the flow switch-feeder-control valve assembly to a point in the system, the pressure of which is responsive to the back pressure from the gun 19, a convenient connection being directly to the pump 17.

The gun 19, which is shown in FIGURE 5, has a body 24 with a depending handle 25 by which the gun may be held and directed with one hand. A control chamber 26 extends into the body 24 from the rear end 27 thereof. A bushing 28 is threaded into the control chamber sufficiently tightly to provide a fluid-tight seal. The bushing 28 has a cylindrical bore 29 through it.

A control shaft 30 extends through the bore 29. A knob 31 is fixed to the end of the control shaft 30. The control shaft 30 is rotatable within the bore 29, but an O-ring 32 or other suitable gasket provides a fluid-tight seal against the flow of liquid from the chamber 26 to the bore 29. A lateral annular flange 33 bears against the gasket 32. A pair of cams 34 and 35 are formed on the shaft 30. The configurations of the cams 34 and 35 will be described hereinafter.

An inlet passage 38, including an inlet valve chamber 39, extends through the body 24 of the gun 19 into communication with the control chamber 26. A hose connector bushing 40 is threaded into the body 24 and has a passage 41 through it in communication with the inlet valve chamber 39. The flexible hose 18 is connected to the connector bushing 40.

A valve seat gasket 43 is positioned between the hose connector bushing 40 and a shoulder 44 in the body 24. The valve seat gasket 43 has a beveled valve seat 45 at the mouth of the passage 41. A ball 46 is movable toward and away from the valve seat 45.

Another beveled valve seat 47 joins the valve chamber 39 and the inlet passage 38. Another ball 48 is movable toward and away from the valve seat 47. A compression spring 49 is positioned between the two balls 46 and 48 and urges them toward their respective valve seats 45 and 47.

A push pin 52 has a rounded head 53 which bears against the cam 34 and a stem 54 which bears against the ball 48.

An outlet tube 58 is connected to a stud 59 which is threaded into the body 24 of the gun 19. The stud 59 has a passage 60 through it. An outlet passage 61 through the body 24 provides fluid communication between the control chamber 26 and the stud passage 60. The tube 58 has a passage 62 through it leading to a small diameter orifice 63. Thus, when open valves permit it, the normal fluid passage through the gun 19 is from the inlet hose 18 through the inlet valve chamber 39, the inlet passage 38, the control chamber 26, the outlet passage 61, through the outlet tube passage 62 and the outlet orifice 63.

There is an auxiliary outlet passage 65 leading from the control chamber 26. An auxiliary valve chamber 66 communicates with the passage 65 and with a passage 67 into which a stud 68 is threaded. The stud 68 has a passage 69 through it which communicates with a passage 70 through an auxiliary outlet tube 71. The passage 70 is unrestricted. The lower end of the auxiliary valve chamber 66 is accessible upon removal of a threaded plug 72.

In the auxiliary valve chamber 66, there is a beveled valve seat 73. A ball 74 is biased by a compression spring 75 toward the valve seat 73. A push pin 76 has a rounded head 77 which bears against the cam 35 and a stem 78 which bears against the ball 74.

While the operation of the gun 19 will be described hereinafter, it is to be noted that the inlet valves and the auxiliary outlet valve are controlled by the cams 34 and 35 which rotate with the shaft 30 upon turning the knob 31.

As shown in FIGURE 6, the cam 34 has a constant radius section 80 which is non-functional. An abrupt reduction 81 in the radius leads to a shorter radius "off" section 82. A section 83 of less abruptly increasing radius leads to a constant radius "run" section 84 of greater radius than the radius of the section 82. Beyond the section 84, there is a short "concentrate" section 85 of gradually increasing radius leading to a point 86 from which there is a non-functional section 87 providing a return to the section 80.

When the rounded head 53 of the push pin 52 is opposite the "off" section 82, the compression spring between the two balls 46 and 48 can bias both toward their valve seats 45 and 47. When the cam 34 is rotated in a clockwise direction as viewed in FIGURE 6 until the constant radius section 84 is opposite the head 53, this section 84, which is the "run" section, depresses the push pin 52 and unseats the ball 48 from its valve seat. The depression of the push pin 52 does not completely compress the spring 49, and sufficient liquid pressure at the inlet 41 can unseat the ball 46 from its valve seat 45. However, further clockwise rotation of the cam 34 brings the "concentrate" section 85 of increasing cross section into position opposite the rounded head 53 and further depresses the push pin 52. This further depression of the push pin 52 pushes the ball 48 further, further compresses the compression spring 49, and presses the ball 46 toward its valve seat 45 with greater force. This depression of the ball 46 by the push pin 52 restricts fluid flow and increases the pressure in the hose 18.

When the knob 31 is released, the pressure of the spring 49 urging the ball 48 upwardly is sufficient to cause the pin 52 to slide against the surface 85 and rotate the cam 34 in a counterclockwise direction until the head 53 reaches the constant radius "run" section 84. Since the "run" section 84 is of constant radius, the head 53 will remain in the "run" section 84 until the cam 34 is rotated by rotation of the knob 31.

As shown in FIGURE 7, the cam 35 has a large section 90 of constant radius. The illustrations of FIGURES 6 and 7 show the cams 34 and 35 in the "off" positions, and it can be seen that a projecting portion 91 is at a position which corresponds to the position of the section 83 on the cam 34. The projection 91 has a side 92 of gradually decreasing radius leading to the section 90. This surface 92 provides a "clear" section on the cam 35, and when the surface 92 contacts the rounded head 77, the valve stem 78 presses the ball 74 downwardly away from its valve seat 73 and establishes communication from the control chamber 26 through the outlet passage 65 and the auxiliary valve chamber 66 to the auxiliary outlet tube 71. The inclined surface 92 will act as a camming surface when the knob 31 is released, the spring 75 being sufficiently strong to cause the head 77 to rotate the cam 35 and the shaft 30 (and the cam 34) in a clockwise direction to automatically reseat the ball 74. The surface 92 is so positioned that, when it is depressing the push pin 76, the head 53 of the push pin 52 is in contact with the run portion 84 of the cam 34.

The construction of a suitable pump 17 for this system is shown in FIGURE 4. The pump 17 has a housing 95 into which inlet and outlet passages 96 and 97 extend. On opposite sides of the housing 95, there are opposing pumping chambers 98 and 99.

A distributor passage 100 communicates with the inlet passage 96 and leads at one to one inlet valve chamber 101 and at the other end to another inlet valve chamber 102. A passage 103 connects the valve chamber 101 to the pumping chamber 98, and a passage 104 connects the valve chamber 102 with the pumping chamber 99.

There are passages 105 and 106 leading from the pumping chambers 98 and 99, respectively. The passage 105 communicates with one outlet valve chamber 107, and the passage 106 communicates with another outlet valve chamber 108. Both outlet valve chambers 107 and 108 communicate with opposite ends of a distributor passage 109 which communicates with the outlet passage 97.

There are curved valve seats 110, 111, 112, and 113 in the valve chambers 101, 102, 107, and 108, respectively. There are valve members 114, 115, 116, and 117 corresponding to the valve seats 110–113. Each valve member 114–117 has a curved valve face 118, and each valve member is biased toward its valve seat by a compression spring 119, each compression spring 119 being seated against a hollow ring 120 pressfitted into each valve chamber. The valves 114 and 115 in the inlet chambers 101 and 102 are biased toward their valve seats by the springs 119, but can be moved from their valve seats when the pressure in the distributor passage 100 is greater than the pressure within the adjacent passage 103 or 104. Likewise, the valve members 116 and 117 are biased toward their valve seats by the compression springs 119, but can be unseated when the pressure in the outlet distributor passage 108 is less than the pressure within the appropriate adjacent passage 105 or 106.

The pumping action is provided from a rotary shaft 124 which rotates within a ball bearing assembly 125 of conventional construction. The shaft 124 carries an eccentric 126 the axis of which is displaced from the axis of the shaft 124. The eccentric 126 bears against two lateral surfaces 127 and 128 projecting from a central piston hub 129.

A pair of pistons 130 and 131 extend from the central hub 129 and project into the pumping chambers 98 and 99, respectively. Each piston 130 and 131 has a curved outer end 132.

A flexible and resilient rubber or plastic cup member 134 fits over the end of each piston 131 and 132. Each cup member 134 has an annular bead or flange 135 that is tightly clamped and pressed between two metal rings 136 and 137 pressfitted into an enlarged recess surrounding each piston member 130 or 131. The rings 136 and 137 hold the bead or flange 135 in a stationary position as the pistons 130 and 131 reciprocate. Therefore, the pistons expand the cup members 134 as they reciprocate, while the cup members 134 provide a liquid seal against the passage of liquid into the area of the shaft 124.

The inlet hose 18 to the gun 19 is connected to a hollow metal fitting 140. The fitting 140 is threaded into the housing 95 of the pump 17 in communication with the outlet passage 97. Another hollow pipe fitting 141 is threaded into the inlet passage 96. The pipe 16 is adapted to be connected to the pipe fitting 141.

Referring to FIGURE 2, the flow switch-feeder-control valve assembly 12 comprises a housing 150 having a water inlet chamber 151 to which the water supply pipe 10 is connected. A large opening 152 connects the water inlet chamber 151 to a water and concentrate mixing chamber 153. One wall of the mixing chamber 153 is defined by a flexible diaphragm 154.

The concentrate conveying hose 14 is connected to a valve assembly housing 156 which has a valve chamber 157 within it. A stud 158 is threaded into the housing 156 and has a passage 159 through it opening to the pipe 14 and to the valve chamber 157. The stud 158 has a beveled valve seat 160 on its inner end surrounding the passage 159. A ball 161 within the valve chamber 157 is biased toward the valve seat 160 by a compression spring 162. There is an opening 164 through the inner end of the valve housing 156 leading from the valve chamber 157.

The valve housing 156 is connected into the side of a stud 168 which is threaded into the upper end of a spring housing 169. The spring housing 169 extends through the center of the flow switch-feeder-control valve assembly housing 150, with the mixing chamber 153 and the diaphragm 154 surrounding the spring housing 169. There is a passage 170 through the spring housing 169. The stud 168 has a recess 171 in it with which the passage 164 communicates. The recess 171 communicates with the opening 170 in the spring housing 169.

Another passage 174 leads from the passage 170 to a valve chamber 175. There is a beveled valve seat 176 between the passage 174 and the chamber 175, and a ball 177 is biased by a compression spring 178 against the valve seat 176.

A passage 179 connects the valve chamber 175 with the mixing chamber 153. An outlet chamber 182, separated by the diaphragm 154 from the mixing chamber 153, communicates with the mixing chamber 153 via a narrow passage 183. The narrow passage 183 is between the inner annular edge 184 of the diaphragm 154 and the spring housing 169. A plate member 185 rests upon the diaphragm 154. The plate member 185 has a down-turned rim 186 lining the central hole in the diaphragm 154, and an outwardly extending annular flange 187. The diaphragm 154 is clamped between the plate portion 185 and the annular flange 187. The annular space between the rim 186 and the spring housing 169 provides the narrow fluid passage 183.

A reacting arm 190 is mounted on a shaft 191 which extends through the housing 150. The reacting arm 190 has an end 192 which rests upon the plate 185. On the end of the shaft 191 outside the housing 150, there is a switch actuating arm 193 which operates a depressible switch contact button 194 in a circuit breaker 195.

The spring passage 170 has an open lower end 198. A pulsation chamber 199 is below the lower end 198 of the passage 170 and is separated therefrom by a flexible diaphragm 200. The central portion 201 of the diaphragm 200 has an opening through it that receives the central shaft portion 202 of a piston valve member 203, and the central portion 201 of the diaphragm 200 is clamped between opposing radial walls 204 and 205 on the piston valve member 203. The upper end 206 of the piston valve member 203 is cylindrical and projects into the spring passage 170. A compression spring 208 biases the piston valve member 203 in a downward direction.

There is a valve chamber 210 leading downwardly from the pulsation chamber 199. The valve chamber has a beveled valve seat 211 formed in its lower end around an opening 212. The pipe 22 is connected into the housing 150 in communiaction with the opening 212. The other end of the pipe 22 is connected into the pumping chamber 98 of the pump 17 (see FIGURE 4). The piston valve member 203 includes a downwardly extending needle valve member 213 having a tapered lower end 214 leading to a point 215. The tapered lower end 214 is movable into and out of contact with the valve seat 211 as the piston valve member 203 reciprocates.

The diaphragm 200 is provided with a small port 216 near the outer periphery of its working surface. The purpose of the port 216 is to allow any leakage past the valve seat 211 to bypass to the low pressure side of the system without building up pressure on the diaphragm 200. When the piston valve member 213 with the tapered lower end 214 is deliberately raised from the seat 211 by pressure resulting from the manipulation of the control valve in the gun 19, the sudden surge of pressure forces the diaphragm 200 against the opposing flat face of the body of the flow switch-feeder-control valve assembly, effectively sealing the port 216 so as to allow the proper pumping action of the piston 206 and diaphragm 200.

*Operation*

The components of this system are so designed that the selective mixing of concentrate and water is controlled by operation of the dispensing gun. This is accomplished by the construction of the flow switch-feeder-control valve assembly which has appropriate valves responsive to changes in pressure at the gun 19 to admit or block the flow of concentrate or of water.

Flow through the gun 19 is controlled by the operating knob 31. As shown in FIGURE 5, in the "off" position of the knob 31, the rounded head 53 of the push pin 52 rests against the small-radius land 82 on the cam 34. This permits the compression spring 49 to press the ball 48 against the valve seat 47 and block the flow of liquid from the hose 18 past the valve seat 47 into the mixing chamber 26. When flow through the hose is completely blocked, the action of the pump 17 quickly builds up pressure in the hose 18 to a high value. This, of course, creates a back pressure which is felt in the pumping chambers 98 and 99 of the pump 17. And it builds up back pressures which are felt at the inlet 141 and in the pipe 16 leading from the flow switch-feeder-control valve assembly 12. Complete blockage of the hose 18 quickly builds up pressure in the pipe 16 and in the outlet chamber 182 of the flow switch-feeder-control valve assembly 12 sufficient to stop flow from the outlet chamber 182. As soon as this flow stops, there is no longer a pressure drop through the narrow passage 183. With equal pressures above and below the diaphragm 154, the diaphragm moves downwardly and carries the plate 185 with it. The reactor arm 190 follows the plate 185 downwardly causing the actuating arm 193 to pivot to a position which operates the switch 195. The switch 195 may be connected directly to the circuit of the pump 17 or it may be connected to appropriate valves as desired for stopping operation of the system. Stopping the system in this manner results in momentary high pressure at the discharge of the pump 17. This pressure is limited by the relief valve 21, which discharges through the pipe or conduit 21a back to the pump inlet. Thus, when the relief valve 21 discharges, there is still no system through-put, and the switch 195 remains open.

Normal operating condition of the system has the knob 31 of the gun 19 rotated to turn the cam 34 in a clockwise direction as viewed in FIGURE 6 until the head 53 of the push pin 52 is against the "run" section 84. In this position, the push pin 52 depresses the ball 48 away from the valve seat 47 and applies some compression of the spring 49 to maintain a force biasing the ball 46 toward its valve seat 45. Against the force of the spring 49, there is the pressure of incoming fluid in the hose 18 coming from the pump 17. This fluid pressure is sufficient to hold the ball 46 away from the valve seat 45 and permit fluid to flow from the hose 18 through the valve chamber 39 into the control chamber 26. The ball 74 in the chamber 66 being against the valve seat 73, only the outlet 61 is available for fluid from the control chamber 26.

The orifice 63 restricts the flow of liquid from the tube 62, causing a buildup of pressure to about 500 p.s.i.g. within the tube 62. This high pressure creates a hard stream emanating from the orifice 63.

As the cam 34 is rotated from the "off" section 82 to the "run" section 84, the cam 35 rotates past the "clear" section 92. This provides assurance that the initial operation of the system will be with clear water dispensed without concentrate mixed in. (Effects of the "clear" condition will appear hereinafter.) Also, the "run" section 84 is of constant radius, so the cam 34 will remain with the "run" section opposite the head 53 of the push pin 52 until the cam 34 is positively rotated.

To cause concentrate to be mixed with the water, the knob 31 is rotated to turn the cam 34 further to the right until the "concentrate" section 85 is opposite the head 53 of the push pin 52. The "concentrate" section 85 depresses the push pin 52 to move the compression spring 49 downward and apply greater force against the ball 46 pressing the ball toward the valve seat 45. This restricts flow of liquid from the hose 18 past the valve seat 45 creating a back pressure in the hose 18 and in the pumping chambers 98 and 99, and the increased back pressure is transmitted through the tube 22 to the opening 212 in the flow switch-feeder-control valve assembly 12. When the cam 34 is in the "run" position, the valve end 214 of the valve member 203 is against the valve seat 211, and there is only a small exposed area of the valve member within the area of the opening 212. However, upon movement of the cam 34 from the "run" to the "concentrate" position, the back pressure in the hose 18 produced by closing or partial closing of the ball 46 against the valve seat 45 is sufficient to move the valve member 213 away from the valve seat 211. This exposes the greater area of the lower face 214 of the valve member 213 to fluid pressure in the pipe 22 and exposes the surface of the diaphragm 200 to the pressure within the pipe 22.

When the operating knob 31 is released, the inclined surface 85 causes the cam 34 to rotate in a counterclockwise direction until the "run" section 84 is again opposite the head 53 of the push pin 52. This, of course, releases the increased pressure on the ball 46 and causes the ball 46 to admit liquid more readily past the valve seat 45. This also reduces the back pressure in the hose 18, thereby reducing the pressure in the pumping chambers 98 and 99 and reducing the pressure sensed by the sensing tube 22 leading to the pulsation chamber 199. However, now the valve member 203 is moved away from the valve seat 211 and the greater area 214 on the lower end of the valve member 213 is exposed to pressure in the pipe 22 as is the lower surface of the diaphragm 200. Consequently, less pressure is required to hold the valve member 213 away from the valve seat 211 against the force of the compression spring 208. Until further pressure changes occur, the diaphragm 200 will remain exposed to pressures in the pipe 22.

The pressures in the pipe 22 are variable as the pressures within the pumping chamber 98 change. These pressures within the pumping chamber 98 will, of course, vary as the piston member reciprocates, alternately forcing liquid through the valve chamber 106 and drawing liquid through the valve chamber 101. The former is, of course, the relatively high pressure stroke and the latter is the relatively low pressure stroke. These alternate pressures are sensed by the pipe 22 and transmitted as pulsating pressures to the diaphragm 200. As the diaphragm 200 pulsates, it causes the valve member 203 to reciprocate vertically and create a pumping action, alternately drawing liquid concentrate past the valve seat 160 into the spring chamber 170 and forcing that liquid from the chamber 170 past the valve seat 176 into the mixing chamber 153.

As concentrate enters the chamber 153, it mixes with liquid entering through the pipe 10 and through the opening 152 into the mixing chamber 153. The mixture of water and concentrate then passes through the narrow opening 186 into the outlet chamber 182, the passage through the opening 186 creating and maintaining a pressure drop on opposite sides of the diaphragm 154. It is the pressure drop through the opening 186 that causes the diaphragm 154 to remain in an upward position, preventing the reacting arm 190 from moving the operating arm 193 to operate the switch 195 and stop the system.

Now, with the system dispensing a mixture of water and concentrate, when it is desired to again dispense clear water without concentrate, the knob 31 on the gun 19 is again rotated. This time, the knob is rotated to position the "clear" section 92 opposite the head 77 on the push pin 78. At this position of the cam 35, the cam 34 is positioned with the "run" section 84 opposite the head 53 of the push pin 52. Hence, the incoming liquid can flow through the valve chamber 39, and depression of the push pin 78 pushes the ball 74 away from the valve seat 73 and permits liquid to flow through the valve chamber 66 to the outlet tube 71.

Since the outlet tube 71 is unrestricted (having no restriction such as the restriction orifice 63) there is an immediate release of pressure upon opening the auxiliary valve chamber 66 to fluid flow. This sudden substantial reduction in pressure is felt in the pumping chambers 98 and 99 and is felt through the sensing tube 22 connected to the chamber 210 in the flow switch-feeder-control valve assembly 12. Even though the entire surface 214 of the valve member 203 as well as the surface of the diaphragm 200 are exposed to this pressure, the pressure reduction is sufficiently great to permit the spring 208 to return the valve member 213 downwardly into contact with the valve seat 211. This, of course, greatly reduces the exposed area of the face 214 of the valve member 213 to pressure in the tube 22. Now, when the knob 31 is released, the inclined surface 92 acts as a reacting cam against the head 77 of the push pin 78 as the compression spring 75 presses the push pin 78 upwardly, and the resulting camming action rotates the cam 35 and therefore the cam 34 and the shaft 30 until the head 77 slides off the surface 92 onto the surface 90. The "run" surface 84 is large enough so that the head 53 of the push pin 52 remains on the "run" section 84. This closes the valve 74 against the valve seat 73 and returns the pressure to normal "run" pressure in the hose 18, but now, with the smaller surface of the valve member 213 exposed to the inlet 212, the valve member 213 remains seated against the valve seat 211.

Concentrate stops flowing because the piston valve member 203 is no longer reciprocating. Consequently, there is no variable pressure condition to alternately open and close the valve chambers 157 and 175.

During all these operations which continue flow through the gun 19 but which change the back pressure within the hose 18 and therefore back through the system, the system is not stopped because there is flow through the flow switch-feeder-control valve assembly past the diaphragm 154. Therefore, there is a pressure drop through the narrow opening 183 creating and maintaining a pressure differential on opposite sides of the diaphragm 154. Since the pressure below the diaphragm is greater than the pressure above the diaphragm, even though the total back pressure of the gun may vary substantially, the diaphragm remains in its relatively upward position, and the reactor arm 190 cannot operate the switch 195. When it is desired to stop operation of the system, the knob 31 is again rotated to move the cam 34 to the position where its "off" section 82 is opposite the head 53 of the push pin 52, permitting the ball 48 to again close against the valve seat 47. Then, all flow stops and the pressure drop on opposite sides of the diaphragm 154 disappears. Now, the diaphragm 154 drops and so does the reactor arm 190. The actuator arm 193 then operates the switch button 194 to stop the pump 17 and stop the system.

It is now clear that the system provides a pressure washer system having a dispensing gun remotely located from a flow switch-feeder-control valve assembly wherein the fluid is dispensed with relatively high back pressure to create a high velocity stream, and yet selection of mixtures of water and concentrate can be made by operations controllable at the gun. It is also now apparent that the changes from clear water to a mixture of water and concentrate, or to "off," are made quickly.

It is also apparent that the system operates with a continuous pulsating pumping action until the system is stopped. It should be noted that the pump 17 shown in FIGURE 4 is of unique design in that the pumping action is accomplished by flexing of the cup members 134 mounted on the piston members 130 and 131. The design has the advantages of a diaphragm with the good seal characteristics and has the advantage of the piston with the stroke advantages.

Various changes and modifications may be made within the purview of this invention as will be readily apparent to those skilled in the art. Such changes and modifications are within the scope and teaching of this invention as defined by the claims appended thereto.

What is claimed is:

1. In a liquid flow system having plural sources of liquids and a pulsating pump to pump the liquids through liquid conveying conduit means, a liquid mixer between the liquid sources and the pump for proportioning the amounts of each liquid fed to the pump, the mixer comprising a housing, a first liquid inlet to the housing, a second liquid inlet to the housing, a liquid outlet from the housing, a first liquid conduit connected from one liquid source to the first liquid inlet, a second liquid conduit connected from another liquid source to the second liquid inlet, a third liquid conduit connected from the liquid outlet to the pump, a mixing chamber in the mixer housing, first liquid passage means connecting the first liquid inlet to the mixing chamber, second liquid passage means connecting the second liquid inlet to the mixing chamber the first liquid passage being in constant communication with the third liquid conduit, thereby causing liquid in the first liquid passage to be constantly subjected to the pumping action of the pump, a first check valve in the second liquid passage means openable upon creation of a pressure drop downstream of the first check valve, a second check valve in the second liquid passage means openable upon creation of a pressure increase upstream of the second check valve, and means responsive to pulsations of the pump for alternately increasing and decreasing the pressure in the second liquid passage means between the first and second check valves to pump liquid through the second passage means.

2. The liquid flow system of claim 1 wherein the last-named means comprises a diaphragm exposed on one side to the second liquid passage means between the check valves and on the other side to pulsation pressures created by operation of the pump.

3. The liquid flow system of claim 2 including means operable upon a substantial drop in pressure on the said other side of the diaphragm for blocking exposure of the said other side to the said pulsation pressures.

4. A liquid mixing and dispensing system comprising a control gun, a liquid inlet to the control gun, liquid outlet means from the control gun, a control chamber communicating the inlet with the outlet, thereby establishing a liquid passage through the gun from the inlet through the control chamber to the outlet, valve means in the liquid passage for regulating the flow of liquid into the control chamber, means to control the valve means to individual settings to selectively provide a first closed setting for completely blocking the flow of liquid through the control chamber, a second restricted setting for permitting restricted flow of liquid through the control chamber, a third restricted setting for providing a greater restriction to flow than is povided by the second setting, and a fourth unrestricted setting in which flow of liquid through the gun is unrestricted, a first liquid source, a second liquid source, a fluid mixer, means to supply the first liquid from its source to the mixer, means to supply the second liquid from its source to the mixer, a first pump to pump liquid from the mixer to the control gun inlet, a second pump for pumping liquid from the second liquid source to the control gun inlet when the second pump is exposed to pulsation of the first pump, means responsive to setting of the valve means to the first setting for deactivating the first pump, means responsive to setting of the valve means to the second setting for permitting liquids to flow serially from the first liquid source, through the first pump and through the gun, means responsive to setting of the valve means in the third setting for exposing the second pump to pulsations of the first pump and thereby causing liquid from the second liquid source to mix with liquid from the first liquid source, and means responsive to setting of the valve means in the fourth setting for terminating exposure of the second pump to pulsations of the first pump.

5. The system of claim 4 wherein the first pump has a first reciprocable pumping element and the second pump has a second reciprocable pumping element, and means interconnecting the first pump and the second pump to cause the second pumping element to reciprocate in response to pressure pulsations resulting from reciprocation of the first pumping element.

6. The system of claim 4 including means defining a restricted passage in the mixer for establishing a pressure drop in fluid flowing through the mixer, a wall in the mixer movable in response to variations in the pressure drop established by the restricted passage, and a switch actuatable to alternately de-energize the first pump upon reduction in the said pressure drop to a predetermined value and energize the first pump upon increase in the said pressure drop above another predetermined value.

7. The system of claim 6 wherein the first pump is downstream of the second pump and the restricted passage is between the second pump and the first pump.

References Cited
UNITED STATES PATENTS

| | | | |
|---|---|---|---|
| 2,578,102 | 12/1951 | Stephenson et al. | 222—334 |
| 2,687,739 | 8/1954 | Shelburne et al. | 239—334 |
| 2,763,513 | 9/1956 | Paradise | 222—334 |
| 2,779,627 | 1/1957 | Gray | 222—334 |
| 2,819,928 | 1/1958 | Liedberg | 222—334 |
| 3,049,302 | 8/1962 | Simmons | 239—585 |
| 3,140,049 | 7/1964 | Norstrud et al. | 222—57 |

EVERETT W. KIRBY, *Primary Examiner.*

M. HENSON WOOD, R. S. STROBEL, *Examiners.*